(12) United States Patent
Riani et al.

(10) Patent No.: US 8,644,372 B1
(45) Date of Patent: Feb. 4, 2014

(54) METHOD AND APPARATUS FOR DETECTING MODULATION SYMBOLS IN A COMMUNICATION SYSTEM

(75) Inventors: Jamal Riani, Fremont, CA (US); Jagadish Venkataraman, Santa Clara, CA (US); Kok-Wui Cheong, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/459,049

(22) Filed: Apr. 27, 2012

Related U.S. Application Data

(60) Provisional application No. 61/484,106, filed on May 9, 2011.

(51) Int. Cl.
*H03H 7/30* (2006.01)
*H03H 7/40* (2006.01)
*H03K 5/159* (2006.01)

(52) U.S. Cl.
USPC .......................................................... 375/233

(58) Field of Classification Search
USPC ................................ 375/233, 232, 295, 340
See application file for complete search history.

(56) References Cited

U.S. PATENT DOCUMENTS

| | | | |
|---|---|---|---|
| 2005/0201478 | A1 | 9/2005 | Claussen et al. |
| 2006/0120477 | A1 | 6/2006 | Shen et al. |
| 2006/0215603 | A1 | 9/2006 | Nishio et al. |
| 2007/0098103 | A1 | 5/2007 | Murakami et al. |
| 2008/0123781 | A1 | 5/2008 | Pisek et al. |
| 2009/0135926 | A1 | 5/2009 | Tsouri et al. |
| 2010/0246720 | A1 | 9/2010 | Wang et al. |

OTHER PUBLICATIONS

Falconer, et al., "Adaptive Channel Memory Truncation for Maximum Likelihood Sequence Estimation," The Bell System Technical Journal, vol. 52, No. 9, pp. 1541-1562 (Nov. 1973).
Black, et al., "A 1-Gb/s, Four-State, Sliding Block Viterbi Decoder," IEEE Journal of Solid-State Circuits, vol. 32, No. 6, pp. 797-805 (Jun. 1997).
Fettweis, et al., "Parallel Viterbi Algorithm Implementation: Breaking the ACS-Bottleneck," IEEE Transactions on Communications, vol. 37, No. 8, pp. 785-790 (Aug. 1989).
Viterbi, "Error Bounds for Convolutional Codes and an Asymptotically Optimum Decoding Algorithm," IEEE Trans. on Information Theory, pp. 260-269 (Apr. 1967).
Forney, Jr., "Maximum-Likelihood Sequence Estimation of Digital Sequences in the Presence of Intersymbol Interference," IEEE Transactions on Information Theory, vol. IT-18, No. 3, pp. 363-378 (May 1972).
Han, et al., "Performance and Implementation of Adaptive Partial Response Maximum Likelihood Detection," IEEE Transactions on Magnetics, vol. 34, No. 5, pp. 3806-3815 (Sep. 1998).

(Continued)

*Primary Examiner* — Chieh M Fan
*Assistant Examiner* — Tanmay Shah

(57) ABSTRACT

In a method for detecting symbols in a signal received via a communication channel, the signal including a plurality of signal points, each signal point in the plurality of signal points is processed using a decision feedback equalizer (DFE) to produce a DFE decision. Reliability of the DFE decision is assessed to determine whether the DFE decision is at least one of i) reliable or ii) not reliable. When it is determined that the DFE decision is not reliable, a block of signal points of the plurality of signal points is processed using a Viterbi Detector (VD) to generate a block of VD decisions. The block of VD decisions is selected to be used in place of a block of DFE decisions.

22 Claims, 7 Drawing Sheets

(56) References Cited

OTHER PUBLICATIONS

Moon, et al., "Equalization for Maximum Likelihood Detectors," IEEE Trans. on Magnetics, vol. 31, No. 2, pp. 1083-1088 (Mar. 1995).

Lee, et al., "Equalized Maximum Likelihood Receiver in a Magnetic Recording Channel," Proceedings of Global Telecommunications Conference, 1993 (GLOBECOM '93), pp. 1970-1973 (1993).

IEEE Std 802.3aq-2006 "IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 2: Physical Layer and Management Parameters for 10 Gb/S Operation, Type 10GBASE-LRM," *The Institute of Electrical and Electronics Engineers, Inc.*, Oct. 16, 2006.

Messerschmitt, "Design of a Finite Impulse Response for the Viterbi Algorithm and Decision-Feedback Equalizer", IEEE International Conference on Communications, ICC 74 Conference Record, New York; *The Institute of Electrical and Electronics Engineers*, 1974, pp. 37D-1-37D-5.

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Mar. 8, 2002.

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, Dec. 9, 2005.

IEEE Draft P802.3ae/D5.0, "Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation," *The Institute of Electrical and Electronics Engineers, Inc.*, May 1, 2002.

Chen, "Home Network Basis: Transmission Environments and Wired/Wireless Protocols," Prentice Hall (Jul. 2003).

Gunnam, et al., "Multi-Rate Layered Decoder Architecture for Block LDPC Codes of the IEEE.802.11n Wireless Standard," IEEE International Symposium on Circuits and Systems, 2007 (ISCAS 2007), pp. 1645-1648 (2007).

Proakis, "5-2-7 Probability of Error for M-ary PSK," in Digital Communications, 4th ed., pp. 269-274, McGraw-Hill, 2001.

Forney, "Chapter 9, Introduction to convolutional codes," Lecture Notes, available at http://ocw.mit.edu/courses/electrical-engineering-and-computer-science/6-451-principles-of-digital-communication-ii-spring-2005/lecture-notes/, pp. 117-134, 2003.

"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.*, May 29, 2009.

Viterbi, et al., "A pragmatic approach to trellis-coded modulation," Communications Magazine, IEEE vol. 27, Issue:7, Publication Year: 1989, pp. 11-19.

METHOD AND APPARATUS FOR DETECTING MODULATION SYMBOLS IN A COMMUNICATION SYSTEM

CROSS-REFERENCES TO RELATED APPLICATIONS

This disclosure claims the benefit of U.S. Provisional Patent Application No. 61/484,106, filed on May 9, 2011, which is hereby incorporated by reference herein in its entirety.

FIELD OF THE DISCLOSURE

The present disclosure relates generally to communication systems and, more particularly, to detection of modulation symbols in the presence of intersymbol interference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a communication system, as a signal travels from a transmitting device to a receiving device, the signal is typically subjected to various sources of noise and interference in the communication channel. In the case of intersymbol interference, for example, transmitted symbols interfere with neighboring symbols thereby degrading system performance. Various techniques are utilized at the receiving end to mitigate intersymbol interference effects in the received signal so as to accurately detect the transmitted symbols. For example, a Viterbi detector can be used as an effective maximum-likelihood sequence detector for detecting modulation symbols subject to ISI interference. However, Viterbi detection cannot be performed efficiently at very high speeds associated with some modern communication systems. Another known technique for decoding modulation symbols in the presence of ISI is decision feedback detection, in which decisions made in regard to previous symbols are fed back and subtracted from a current symbol so as to cancel effects of the previous symbols on the current symbol. Decision feedback detection is relatively easy to implement and can operate at relatively high speeds, but does not generally achieve performance that can be achieved using the Viterbi detection technique.

SUMMARY

In one embodiment, a method for detecting symbols in a signal received via a communication channel, wherein the signal includes a plurality of signal points. The method includes processing each signal point in the plurality of signal points using a decision feedback equalizer (DFE) to produce a DFE decision. The method also includes assessing reliability of the DFE decision to determine whether the DFE decision is at least one of i) reliable or ii) not reliable. The method further includes, when it is determined that the DFE decision is not reliable, processing a block of signal points of the plurality of signal points using a Viterbi Detector (VD) to generate a block of VD decisions. Additionally, the method includes selecting the block of VD decisions to be used in place of a block of DFE decisions.

In another embodiment, an apparatus for detecting symbols in a signal received via a communication channel, wherein the signal includes a plurality of signal points. The apparatus comprises a decision feedback equalizer (DFE) configured to process each signal point in the plurality of signal points to produce a DFE decision. The apparatus also comprises a reliability unit configured to assess reliability of the DFE decision to determine whether the DFE decision is at least one of i) reliable or ii) not reliable. The apparatus further comprises a Viterbi detector (VD) configured to, when it is determined that the DFE decision is not reliable, process a block of signal points of the plurality of signal points to generate a block of VD decisions. The apparatus is configured to select the block of VD decisions to be used in place of a block of DFE decisions.

DETAILED DESCRIPTION

Figure 1:
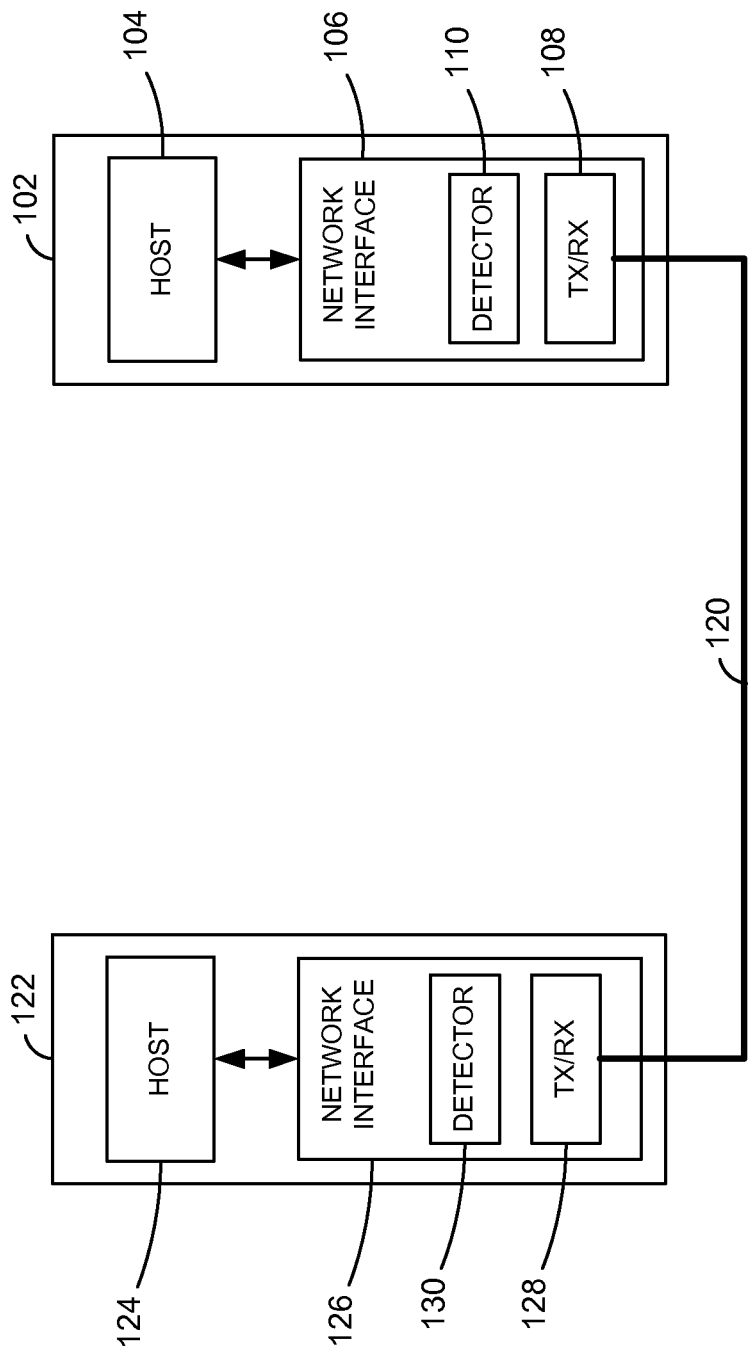
FIG. 1 is a block diagram of an example communication network including a communication device which utilizes the hybrid detection techniques described herein to efficiently demodulate a received data stream, according to an embodiment.

FIG. 1 is a block diagram of an example communication network 100 including a communication device 102 which utilizes the hybrid detection techniques described herein to efficiently demodulate a received data stream, according to an embodiment. The communication device 102 includes a host processor 104 coupled to a network interface 106. The network interface 106 includes a transceiver 108 and a detector 110. Similarly, a communication device 122 includes a host processor 124 coupled to a network interface 126. The network interface 126 includes a transceiver 128 and a detector 130. The communication device 102 communicates with (i.e., transmits data to and/or receives data from) the device 122 via a communication link 120. In one embodiment, the communication link 120 corresponds to a multimode optical fiber cable (e.g., used in a 10 Gbs Ethernet connection). In another embodiment, the communication link 120 corresponds to a different type of a wired connection (e.g., a single-mode fiber communication link, twisted-pair cable, balanced copper cable, etc.), or to a wireless communication link.

In some embodiments, the hybrid detection techniques described herein are used for detecting data retrieved from a data storage device, for example in magnetic disk drive systems and/or optical data storage systems such as compact disc (CD) systems or digital versatile disc (DVD) systems, or in any other optical or non-optical data storage systems. In such embodiments, data stored on a storage device is retrieved by a read channel device of a disk drive control system. Such a read channel device, in some embodiments, includes a detector (similar to the detector 110, 130 of FIG. 1) that implements hybrid detection techniques described herein to detect data retrieved from a storage device.

Figure 2:
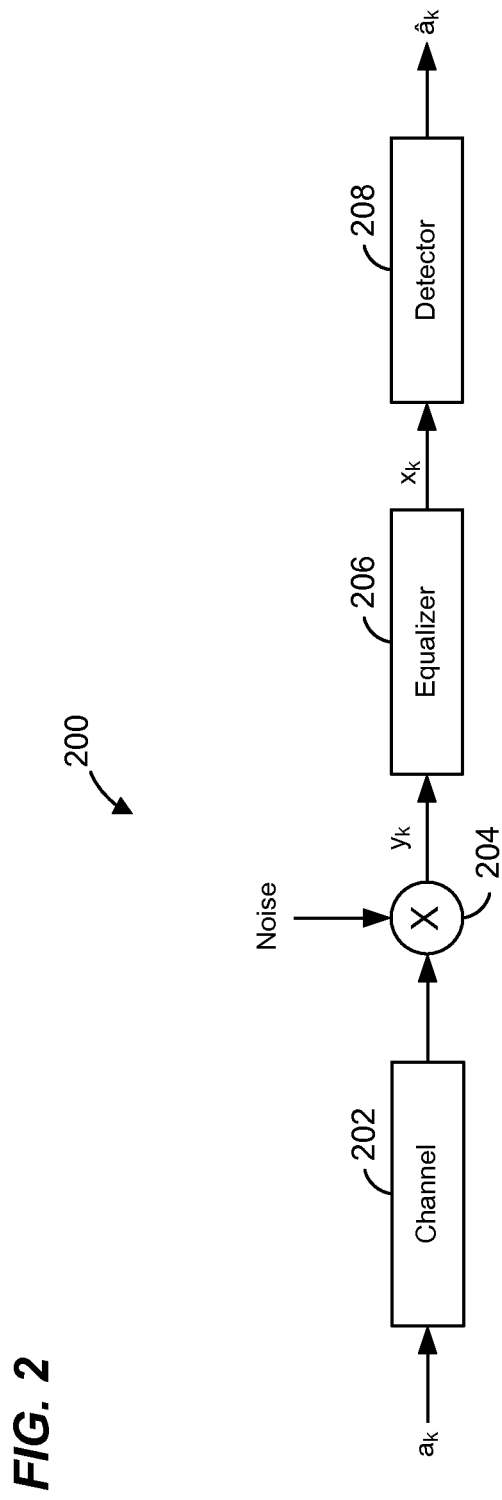
FIG. 2 is a block diagram of an example system in which hybrid detection techniques of the present disclosure are utilized, according to an embodiment.

FIG. 2 is a block diagram of an example system 200 in which hybrid detection techniques of the present disclosure are utilized, according to an embodiment. A transmitting communication device (e.g., one of the communication devices 102 and 122 of FIG. 1) transmits data to a receiving communication device (e.g., the other one of the communication devices 102 and 122 of FIG. 1). According to an embodiment, the transmitted data is modulated according to a certain modulation alphabet, wherein each modulation symbol represents a particular sequence of one or more information bits. In some embodiments, for example in some embodiments in which the data is to be stored on a storage device, "modulating" the data correspond to encoding the data with a suitable code for data storage. In an embodiment, as the transmitted signal travels through a communication channel 202, the transmitted signal is subjected to intersymbol interference by way of which the modulation symbols in the transmitted signal are "smeared" in time, and as a result, each modulation symbol in the signal received by the receiving device is corrupted by signal energy that has spread from one or more of the neighboring transmitted symbols in the communication channel 202. In the channel model 200, a transmitted modulation symbol transmitted at time k is represented as $a_k$. The corresponding received symbol at the input to the receiving device can be represented as:

$$y_k = \sum_{l=o}^{m} h_l a_{k-l} + n_k \quad \text{Equation 1}$$

where h represents the impulse response of the communication channel 202, and $n_k$ is a suitable model of noise, such as, for example, independent identically distributed Additive White Gaussian Noise (AWGN) with mean zero and a variance $\sigma^2$, or another suitable model of noise.

As illustrated in FIG. 2, according to an embodiment, the received symbol $y_k$ is equalized in the receiver by the feed forward equalizer (FFE) 206. The FFE 206 can be, by way of example, a finite impulse response (FIR) filter. In some embodiments, the feed forward equalizer 206 performs partial response equalization that transforms the impulse response h of the communication channel 202 to a desired target channel response $g_k$. Such partial response equalization shapes the channel (e.g., shortens the impulse response of the channel) to a particular target response and allows a known degree of intersymbol interference to remain in the received signal. The target channel response for a detector is optimized using certain criteria which vary depending on the embodiment. For example, in an embodiment, the target channel response is optimized using minimum mean square error (MMSE) optimization which minimizes the mean square error between the equalized channel output and the target response. According to an embodiment, equalization performed by the equalizer 206 is also subject to a unity energy constraint (or "monic constraint", i.e., the first tap of the target response is constrained to unity.) In any event, the partially equalized received signal is then processed by the hybrid detector 208 which attempts to accurately determine the identity of each transmitted modulation symbol and thereby allow the receiver to accurately recover the transmitted data. Operation of the hybrid detector 208 is explained in more detail below in connection with FIG. 3.

Figure 3:
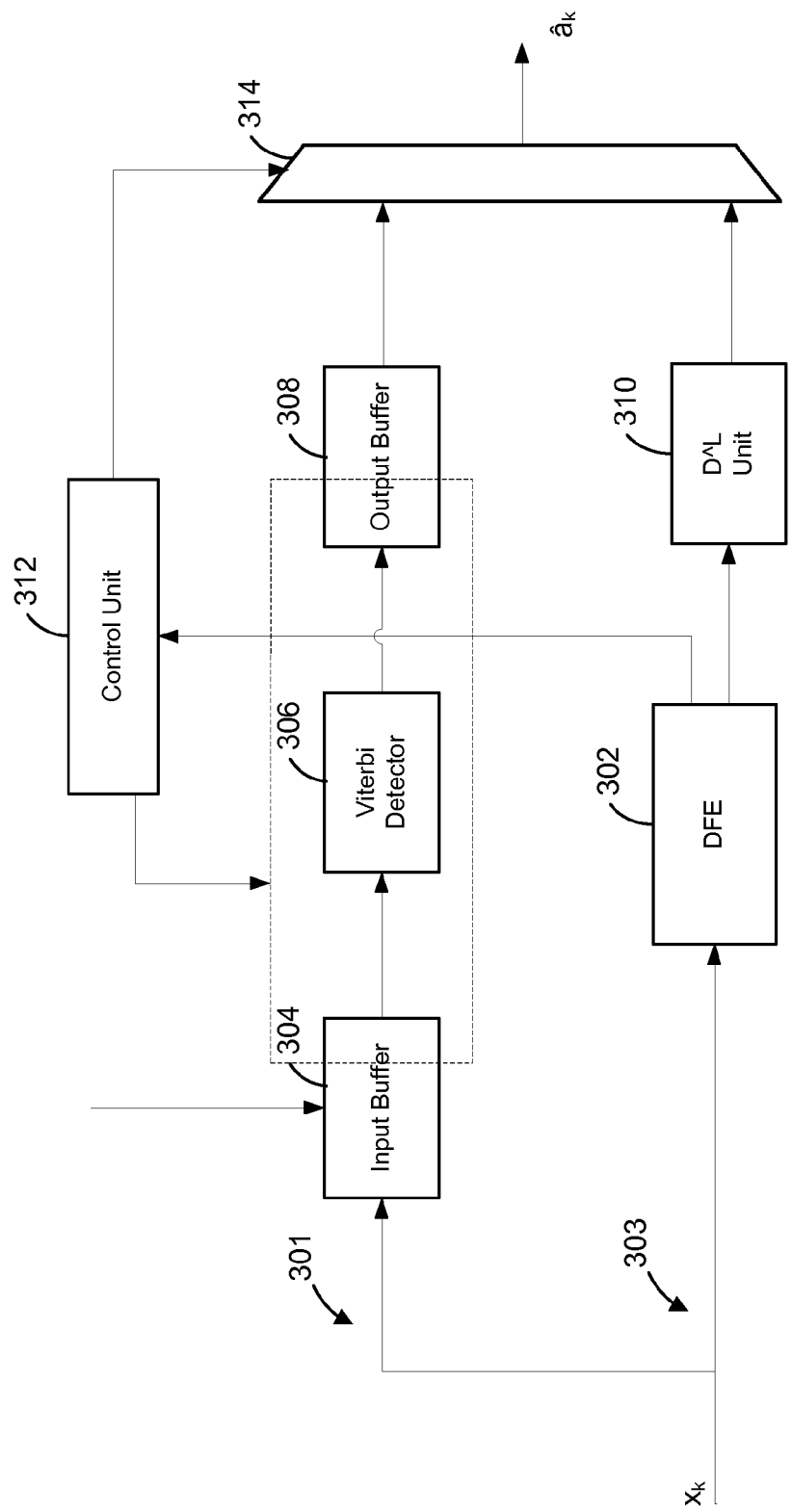
FIG. 3 is a block diagram of a hybrid detector, according to an embodiment.

FIG. 3 is a diagram of a hybrid detector 300, according to an embodiment. In an embodiment, the hybrid detector 300 corresponds to the detector 208 of FIG. 2. The hybrid detector 300 includes a decision feedback path 301 and a Viterbi detection path 303. The decision feedback path 301 includes a decision feedback equalizer (DFE) 302 and a delay unit 310. In an embodiment, the DFE 302 operates at the baud rate (or symbol rate) 1/T, where T is the symbol duration, to process each received symbol (or "signal point") and generate a decision in regard to which of the possible transmitted symbols (e.g., in a modulation alphabet used at the transmitter) the received symbol corresponds. According to an embodiment, the DFE 302 operates continuously and processes each received symbol, while the Viterbi detection circuitry of the Viterbi detection path 301 is disabled and does not process any symbols unless the DFE data is likely to be unreliable (e.g., under certain channel conditions). To this end, as illustrated in FIG. 3 and explained in more detail below in connection with FIG. 4, the DFE 302 outputs a reliability bit $R_k$. According to an embodiment, the hybrid detector 300 utilizes the reliability bit $R_k$ to determine when the Viterbi detection circuitry needs to be enabled so that inaccurate decisions made by the DFE 302 can be replaced by more accurate decisions made by a Viterbi detector 306. In this way, in various embodiments and/or scenarios, the hybrid detector 300 is able to achieve detection performance that is very close to optimal detection in the presence of ISI (e.g., maximum likelihood sequence detection (MLSD) performance) while maintaining power consumption generally associated with systems employing DFE detection with lower detection accuracy. Operation of the DFE 302, according to an embodiment, is described first, in more detail, in connection with FIG. 4.

Figure 4:
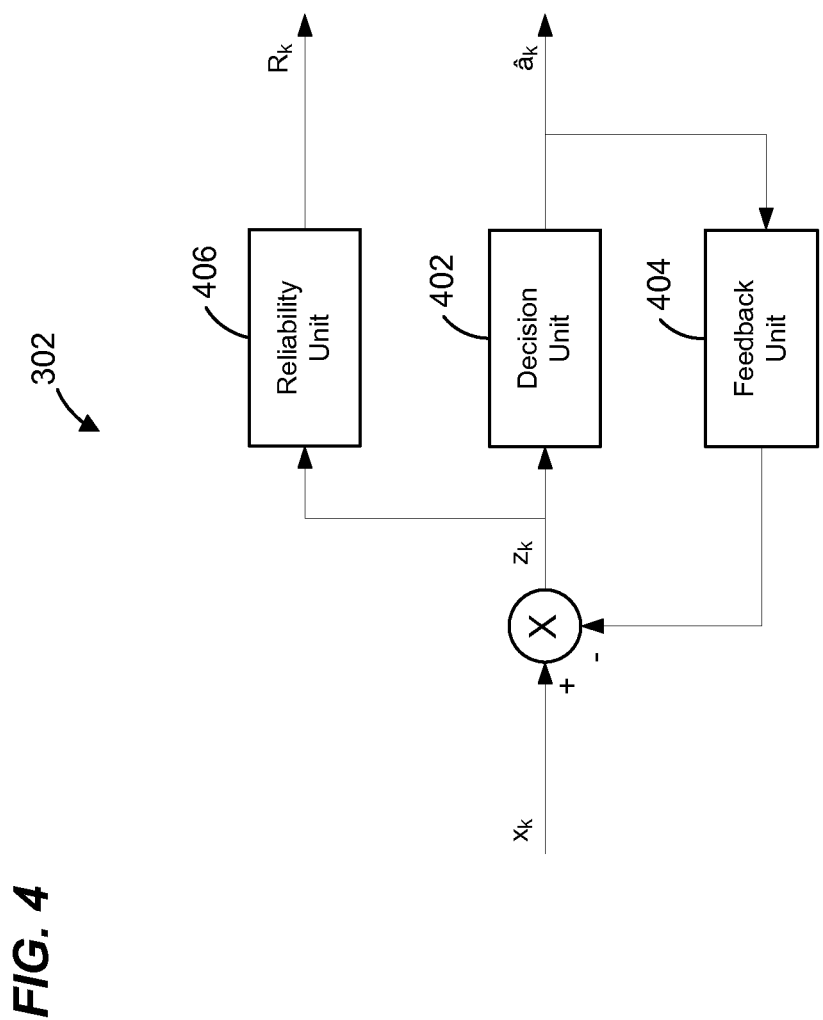
FIG. 4 is a block diagram of a decision feedback detection unit, according to an embodiment.

As illustrated in FIG. 4, the DFE 302 includes a decision unit 402 and a feedback unit 404. In operation, decisions made by the decision unit 402 in regard to the identity of previously received modulation symbols are used to mitigate or eliminate intersymbol interference in the symbol that is currently being detected. To this end, the decisions made by the decision unit 402 corresponding to a desired number of previously received symbols (e.g., corresponding to the length of the channel target response) are fed back to the input of the decision unit 402 via the feedback filter 404. The decision values, weighted by the feedback filter 404, are subtracted from the current input symbol $x_k$ to generate a compensated input $z_k$. The compensated symbol $z_k$ is then used by the decision unit 402 to generate a decision in regard to the currently received modulation symbol $x_k$. In an embodiment, the decision unit 402 is a decision "slicer" that generates a decision for the input $z_k$ by comparing the slicer input $z_k$ to a predetermined threshold. For instance, in a case of binary pulse amplitude modulation (PAM2), the decision unit 402 compares the input $z_k$ to a threshold (e.g., 0) and determines that the transmitted bit is a logic 0 if the input $z_k$ is below the threshold and a logic 1 if the input $z_k$ is above the threshold. Typically, DFE decisions are correct (i.e., the decision corresponds to the symbol that was transmitted) at least for most processed symbols $z_k$, especially when the signal to noise ratio (SNR) of the received signal is sufficiently high. However, especially in situations in which the received signal SNR is low (e.g., due to a noisy communication channel), DFE decisions are more likely to become unreliable, according to an embodiment.

To detect unreliable decisions made by the decision unit 402, in an embodiment, the DFE equalizer 302 includes a reliability unit 406. In an embodiment, the reliability unit 406 accesses the reliability of each decision made by the decision unit 402. Decision reliability is assessed by the reliability unit 406 using any suitable technique. For example, in one embodiment, the reliability unit 406 compares the magnitude $z_k$ to a predetermined threshold $\alpha$ and determines that the output of the decision unit 402 is reliable if the magnitude of the input $z_k$ is above the threshold, and that the decision is not reliable if the magnitude $z_k$ is below the threshold. According to an embodiment, to indicate the assessed reliability for each processed symbol $z_k$, the reliability unit 406 outputs a corresponding reliability bit $R_k$ (e.g., having a value of logic 1 to indicate that a decision is reliable and a value of logic 0 to indicate that a decision is not reliable). Because an unreliable, and likely incorrect, decision by the decision unit 402 is fed back and used in the decision regarding the subsequent symbol (or symbols), an incorrect decision by the decision unit 402 typically propagates and results in a burst of DFE decision errors. The length of the burst of errors (or "burst error length") depends on, for example, the number of filter taps, or filter tap weights, used in the feedback unit 404.

Referring back to FIG. 3, to mitigate effects of such decision errors, in an embodiment, the hybrid decoder 300 activates the Viterbi detector (VD) 306 of the Viterbi detection path 303 to generate more accurate VD decisions and utilizes these VD decisions in place of the unreliable DFE decisions. In an embodiment, the Viterbi Decoder 306 performs maximum likelihood sequence detection (MLSD) utilizing the Viterbi algorithm for a block of received symbols $x_k$ around a symbol $x_k$ for which the DFE decision is deemed to be unreliable (e.g., as indicated by the corresponding reliability bit $R_k$). In some embodiments, the size of the block of symbols operated on by the VD 306 ("VD detection window") is determined based on the burst error length associated with the DFE 302. In one such embodiment, the size of the block of symbols is determined based on the "worst case" burst error length, or a burst error length with likelihood suitably lower than the targeted error rate. Limiting the size of the VD detection window to the worst case DFE burst error length improves power efficiency of the hybrid detector 300 while allowing the hybrid detector 300 to achieve the target error rate, in at least some embodiments. In one embodiment, the VD detection window is extended further, beyond the worst case DFE burst error length, by a "safety factor" to catch unreliable DFE decisions that the reliability unit 406 may have missed. According to an embodiment, once the VD 306 outputs the corresponding decisions, the VD circuitry is powered off as to reduce the overall power consumption of the hybrid detector 300.

More specifically, according to an embodiment, once enabled at time k, the VD 306 processes a block of symbols corresponding to the time interval between $k-L_0$ and $k+L_1$. The size of the block B operated on by the VD 306 can then be expressed as $B=L_0+L_1+1$. In general, according to an embodiment, the VD 306 processes extra symbols in addition to the symbols for which VD decisions are generated. The extra symbols are needed for VD algorithm initial synchronization (e.g., for determining an initial path metric) and for final decision trace-back, for example. Accordingly, in the example embodiment in which the VD 306 processes symbols in the time interval between $k-L_0$ and $k+L_1$, the VD 306 outputs VD decisions for the symbols corresponding to a time interval between $k-L'_0$ and $k+L'_1$, where $L'_0<L_0$ and $L'_1<L_1$. The size of the output block of VD decisions made by the VD 306 can be expressed as $B'=L'_0+L'_1+1$.

In operation, the VD 306 applies the Viterbi algorithm to the sequence of symbols in the block B. More specifically, in an embodiment, the VD 306 determines branch metrics for the possible states for each processed symbol, adds the branch metrics to a path metric (which is an accumulation of previously determined branch metrics), and compares the results of the additions for each of the possible states. The result corresponding to the smallest sum (i.e., the smallest path distance) is then selected as the path metric for the next processed symbol. This process of adding, comparing, and selecting (ACS or ACS loop) needs to be completed before the next symbol can be processed. Consequently, in some embodiments and/or scenarios, particularly when a system operates at a suitably high speed, ACS processing for a current symbol cannot be completed by the VD 306 if the VD 306 operates at the system clock rate (i.e., baud rate). Accordingly, in an embodiment, the clock rate used for the VD 306 is reduced compared to the system rate by a certain factor N. Accordingly, in an embodiment, the VD 306 operates at a clock rate equal to 1/NT ("VD clock rate"). In an embodiment, the factor N is chosen as to allow the ACS process to be completed for each received symbol.

To facilitate operation of the VD 306 at a lower clock rate, the VD path 303 includes an input buffer 304 which continuously stores received (and equalized) symbols at the clock rate 1/T. As a result, when VD 306 is enabled, the input buffer 304 contains the initial ($L_0$) symbols to be processed by the VD 306. According to an embodiment, the input buffer 304 continues to store consequently received symbols until the additional ($L_1$) symbols that need to be processed by the VD 306 are stored in the input buffer 304. In an embodiment, to allow the VD 306 to complete processing all symbols in the intended block, the input buffer 304 then stops storing the received symbols until VD 306 finishes processing the block (at the lower VD clock rate). Because the VD 306 operates at the clock rate 1/NT, according to an embodiment, the VD 306 requires N*B clock cycles of the system clock (i.e., clock rate of 1/T) to process the intended block of size B and, consequently, to generate the VD decisions for the received symbols corresponding to the block B'.

According to an embodiment, the VD decisions are stored in an output buffer 308 at the clock rate 1/NT and are output by the output buffer 308 at the system clock rate 1/T. Generally speaking, the VD area indicated in FIG. 3 by the block 316 operates at the VD clock rate 1/NT, according to an embodiment. A multiplexer 314 is controlled to select the generated VD decisions to be used in place of the unreliable DFE decisions. When the stored VD decisions are all outputted by the buffer 308, in an embodiment, to further reduce the power consumption of the hybrid detector 300, the output buffer 308 is powered off until the VD 306 is enabled to process another block of received symbols. Because DFE decisions are generated at a faster rate compared to the VD decisions, in an embodiment, the delay unit 310 is used to equalize latencies of the two paths and thereby align the decision outputs for corresponding symbols by the two paths of the hybrid detector 300.

The control unit 312 generates the various control signals needed for proper operation of the hybrid detector 300 (e.g., to enable the VD circuitry for processing a block of bits, to control the multiplexer 314, etc.). In some embodiments, DFE decisions made by the DFE 302 at the system clock rate are also utilized for performing other receiver functions that require at least preliminary decisions, e.g., timing recovery functions, gain loops, etc.

According to an embodiment, once the VD 306 is enabled, the VD 306 cannot process any additional data until processing of the current block of B symbols is complete. Consequently, in some embodiments and/or scenarios, because DFE decisions are generated at a faster rate compared to the VD decisions, if an unreliable DFE decision is detected (e.g., by the reliability unit 406 of FIG. 4) outside of the VD detection window, this decision cannot be replaced by a more reliable VD decision. In some embodiments, in such situations, the hybrid detector 300 utilizes less reliable DFE decisions until the VD detector 306 completes its operation and becomes available for processing an additional block. In other embodiments, in such situations, the hybrid detector 300 includes one or more additional VD detectors (along with extra supporting circuitry), and enables an additional VD detector to generate VD decisions for the additional block for which DFE decisions are expected to be less reliable during the time when the VD detector 306 is not available.

Bit error rate (BER) performance of an example hybrid detector, such as the hybrid detector 300, and selection of hybrid detector parameters that optimize the performance are now described for an example embodiment. For ease of explanation, the example embodiment utilizes PAM2 modulation with logic 0 and logic 1 represented by the set {+1, −1}. However, BER performance analysis and hybrid detector parameter selection criteria described herein are not limited to systems utilizing PAM 2 modulation and are used in systems utilizing other modulation schemes in other embodiments.

According to the example embodiment, the BER associated with the hybrid detector 300 is approximately expressed as:

$$BER \approx \max\left\{Q\left(\frac{1+\alpha}{\sigma}\right); NBQ\left(\frac{1-\alpha}{\sigma}\right)Q\left(\frac{1}{\sigma}\right); Q\left(\frac{dmin}{\sigma}\right)\right\}$$ Equation 2 where $\alpha$ is the VD enabling threshold (e.g., used by the reliability unit 406 of FIG. 4), $\sigma$ is the root-mean-square (RMS) of channel noise, N is the clock reduction factor for the VD 306, B is the VD detection window block size, d min is the minimum Euclidian distance of an error event associated with the VD detector 306, and Q( ) denotes the Q function. For the approximation of BER in Equation 2, the following assumptions are made: 1) that the probability of an unreliable DFE decision is sufficiently low (i.e., $p_e = P_r[R_k = 0] << 1$, where $R_k = 0$ indicates that a DFE decision is not reliable) and 2) that NB>>L'$_1$. Further, it is assumed that the error propagation in the DFE 302 is negligible.

The first term of the BER approximation in Equation 2 corresponds to the BER of the DFE 302 when the reliability bit $R_k = 1$, indicating that the DFE decisions are reliable (assuming no error propagation in the DFE 302). The second term of the BER approximation in Equation 2 corresponds to the BER of the DFE 302 during a time period when the VD 306 is not available (assuming the hybrid detector 300 includes only one VD) to process unreliable DFE decisions made by the DFE 302. The last term in Equation 2 corresponds to the theoretical (i.e., best case) BER performance of the hybrid detector 300.

In accordance with Equation 2, in an embodiment, the enabling threshold a for detecting unreliable DFE decisions (e.g., by the reliability unit 406 of FIG. 4) is SNR-dependent and is determined such that the first two BER terms of Equation 2 are equalized. Equating the first two BER terms in Equation 2 minimizes "false alarm" situations in which reliable DFE decisions are deemed to be unreliable by the reliability unit 406, while maximizing the probability that a "real" unreliable decision is detected by the reliability unit 406. Further, in accordance with Equation 2, in an embodiment, the enabling threshold $\alpha$ is bound by the theoretical best case performance:

$$1+\alpha \leq d_{min}.$$ Equation 3

Equation 2 also shows that if Equation 4 (below) holds true, then the hybrid detector 300 achieves maximum likelihood performance:

$$NBQ\left(\frac{2-d_{min}}{\sigma}\right)Q\left(\frac{1}{\sigma}\right) \leq Q\left(\frac{dmin}{\sigma}\right).$$ Equation 4

Another outcome evident from Equation 2 is that by including multiple Viterbi detectors such that the second term of Equation 2 (i.e., BER associated with probability of an unreliable DFE decision when the VD is unavailable), overall BER of the hybrid detector 300 is improved. In general, if the hybrid detector 300 includes p VDs, then the associated BER can be represented by:

$$BER \approx \max\left\{Q\left(\frac{1+\alpha}{\sigma}\right); C(NB, p)Q\left(\frac{1-\alpha}{\sigma}\right)Q\left(\frac{1}{\sigma}\right); Q\left(\frac{dmin}{\sigma}\right)\right\}$$ Equation 5 where C(NB, p) represents the total number of possible combinations of p objects in a set of NB objects. In this case, it can be shown that if Equation 6 is satisfied, then the hybrid detector achieves maximum likelihood performance:

$$C(NB, p)Q\left(\frac{2-d_{min}}{\sigma}\right)^p Q\left(\frac{1}{\sigma}\right) \leq Q\left(\frac{dmin}{\sigma}\right).$$ Equation 6

As can be seen from Equations 5 and 6, BER of a hybrid detector such as the hybrid detector 300 of FIG. 3 decreases as the number of provided VDs increases. —Equations 5 and 6 also show that as long as $d_{min} < 2$ (which is the case in many target responses with monic constraints), there exists a p that allows the hybrid detector 300 to achieve maximum likelihood performance. Accordingly, in various embodiments, hybrid detection is designed as a trade-off between a target bit error rate and acceptable power consumption and implementation area, which generally depend on the number of Viterbi detectors included in the hybrid detection scheme. Further, according to an embodiment utilizing p Viterbi detectors, power consumption depends on channel conditions. That is, when channel conditions are suitably good, only a small number of available Viterbi detectors need to be operated in parallel resulting in relatively low power consumption by the hybrid detector. As channel conditions worsen, in this embodiment, more Viterbi detectors are enabled and power consumption increases to maintain a desired target BER performance.

Figure 5:
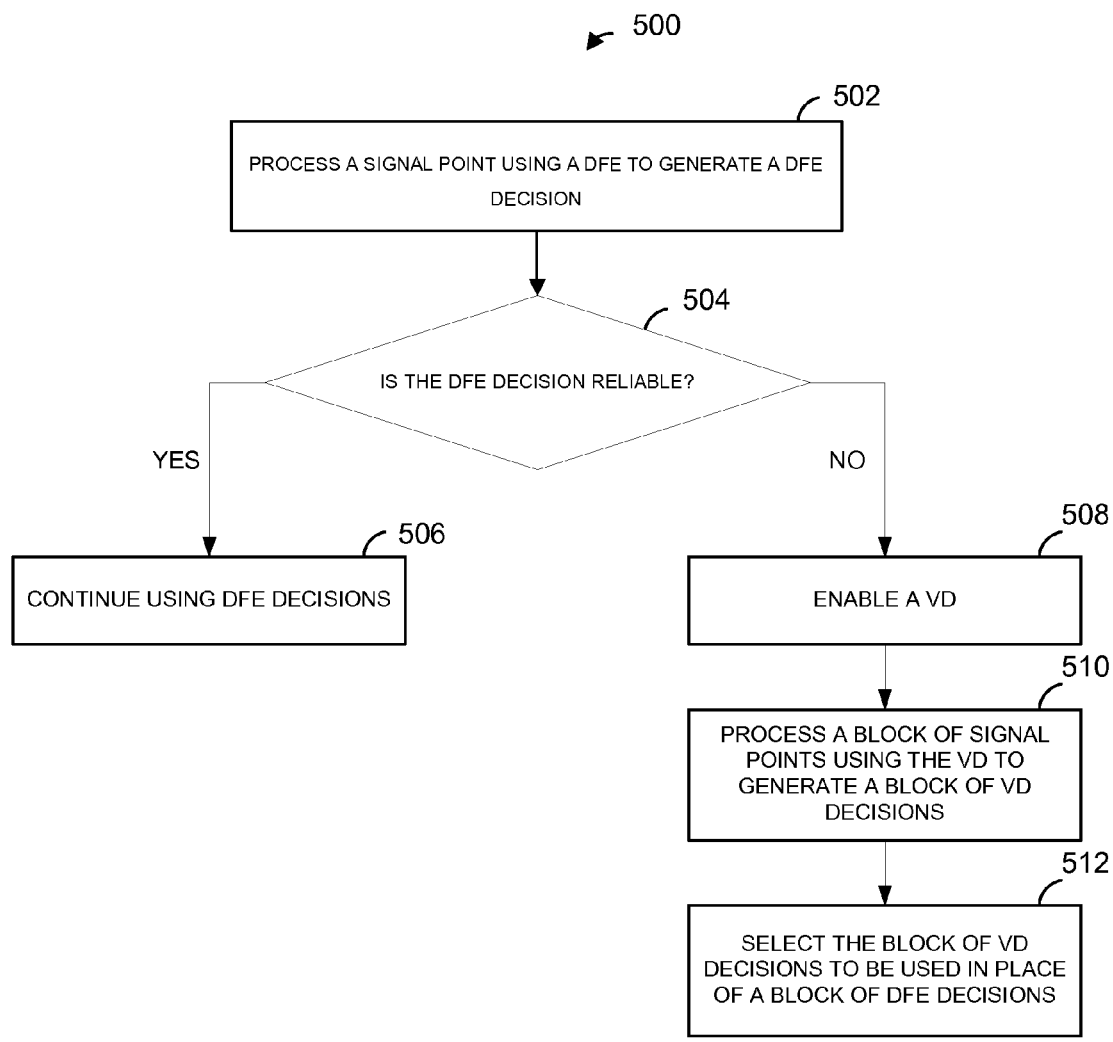
FIG. 5 is a flow diagram of an example method for detecting symbols in a received signal, according to an embodiment.

FIG. 5 is a flow diagram of an example method 500 for detecting symbols in a received signal, according to an embodiment. With reference to FIG. 1, the method 500 is implemented by the network interface 106 and/or the network interface 126, in an embodiment. For example, in one such embodiment, the detector 110 is configured to implement the method 500. In another embodiment, the detector 130 is additionally or alternatively configured to implement the method 500. As another example, in another embodiment, the method 500 is implemented by a data retrieval device, e.g., by a read channel device of a disk drive control system, to detect data retrieved from a data storage device. In other embodiments, the method 500 is implemented by other suitable devices.

At block 502, a signal point (e.g., corresponding to a modulation symbol) is processed by a DFE. A DFE decision regarding the identity of the corresponding transmitted symbol is generated.

At block 504, it is determined whether the DFE decision generated at block 502 is reliable. For example, at block 504, a magnitude of an input signal to a decision unit used for generating a DFE decision is compared to a threshold. If the magnitude is above the threshold, it is determined that the DFE decision is reliable. On the other hand, if the magnitude is below the threshold, it is determined that the DFE decision is not reliable.

If it is determined that the DFE decision is reliable, the method goes on to block 506 and the DFE decision is used as the decision for the processed signal point (or symbol).

On the other hand, if it is determined at block 504 that the DFE decision is not reliable, then a VD is enabled at block 508. At block 510, the VD processes a block of signal points around the signal point based on which it was determined at block 504 that the DFE decision is not reliable. A block of VD decisions is generated based on the block of signal points processed by the VD. In an embodiment, the VD is disabled after the block of VD decisions is generated at block 510.

At block 512, the block of the more reliable VD decisions generated at block 510 is selected to be used in place of a block of the less reliable DFE decisions.

Figure 6:
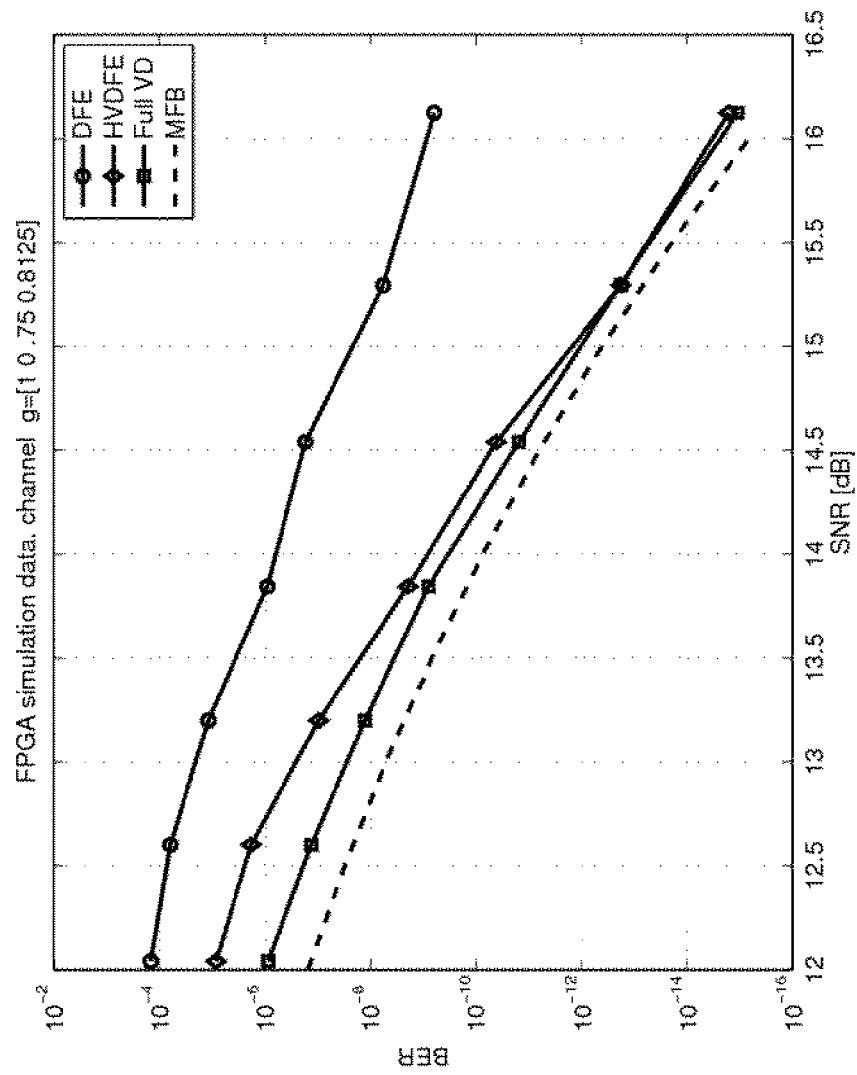
FIG. 6 is a diagram of simulated performance results for the hybrid detection schemes of the present disclosure.

FIG. 6 illustrates simulated performance results for the hybrid detection schemes of the present disclosure, according to an embodiment. As can be seen in FIG. 6, in this embodiment, the hybrid detection techniques described herein achieve bit error rate performance that is very close to the bit error performance achieved by a Viterbi detector enabled to generate decisions for an entire signal rather than for only a certain block of signal points (for which DFE decisions are likely to be unreliable). This is particularly true at suitably high signal to noise ratios of the received signal (e.g., SNR above 15 dB).

Figure 7:
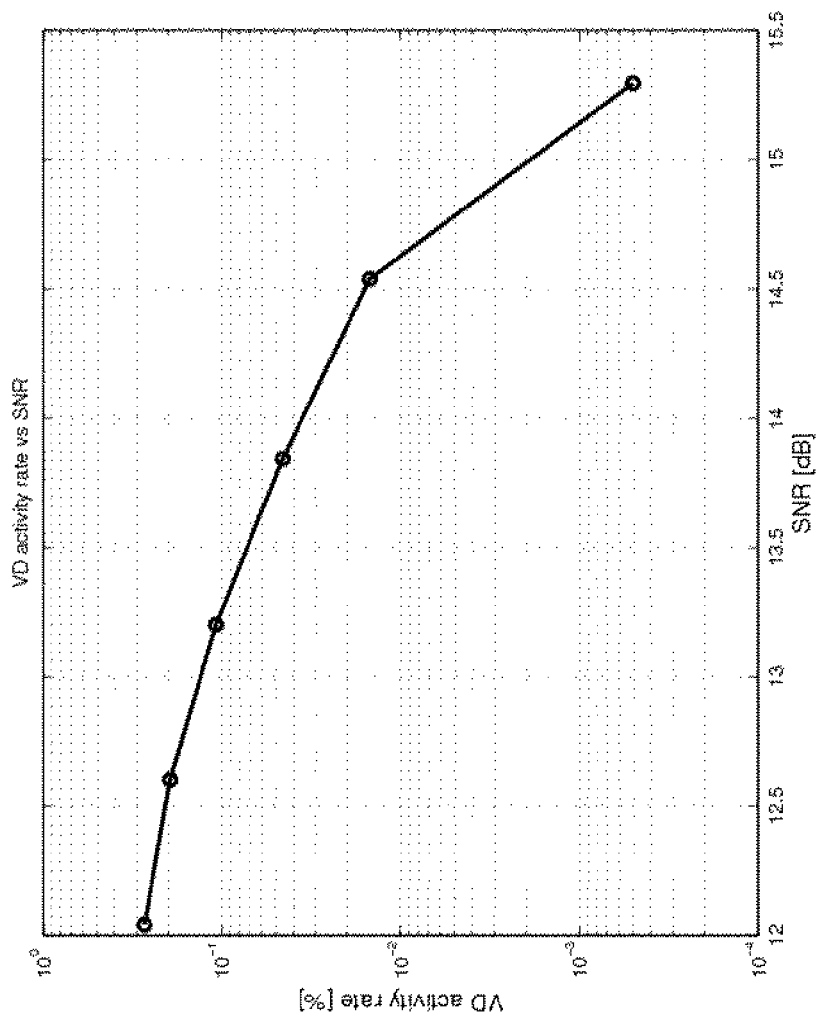
FIG. 7 is a diagram of simulated Viterbi detection enabling rate in a hybrid detection scheme of the present disclosure.

FIG. 7 illustrates simulated VD enabling rate in a hybrid detection scheme of the present disclosure, according to an embodiment. As can be seen in FIG. 7, the VD enabling rate is relatively low and decreases as the signal to noise ration of the received signal increases. This leads to a relatively low consumption of power associated with the hybrid detection techniques.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored on/in any computer readable memory such as a magnetic disk, an optical disk, or other storage medium, —a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embody computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the various embodiment have been described with reference to specific examples (which are intended to be illustrative only and not to be limiting of the invention), changes, additions and/or deletions may be made to the disclosed embodiments without departing from the scope of the claims.

What is claimed is:

1. A method for detecting symbols in a signal received via a communication channel, wherein the signal includes a plurality of signal points, the method comprising:
processing each signal point in the plurality of signal points, using a decision feedback equalizer (DFE), to produce a DFE decision;
assessing reliability of the DFE decision to determine whether the DFE decision is one of i) reliable or ii) not reliable;
when it is determined that the DFE decision is not reliable, processing a block of signal points of the plurality of signal points, using a Viterbi Detector (VD), to generate a block of VD decisions; and
selecting the block of VD decisions to be used in place of a block of DFE decisions.

2. A method according to claim 1, further comprising:
operating the DFE at a clock rate 1/T; and
operating the VD at a clock rate 1/NT;
wherein
T is a symbol duration of each symbol in the signal, and
N is an integer.

3. A method according to claim 2, wherein N is determined based on a processing time of an Add Compare Select (ACS) loop of the VD.

4. A method according to claim 1, wherein the DFE includes a decision unit for generating DFE decisions, and wherein assessing reliability of the DFE decision comprises comparing an input of the decision unit to a threshold.

5. A method according to claim 4, wherein the threshold is determined based on a signal to noise ratio (SNR) of the received signal.

6. A method according to claim 1, wherein a size of the block of VD decisions is determined based on a burst error length of the DFE.

7. A method according to claim 6, wherein the burst error rate of the DFE is the worst case burst error rate of the DFE.

8. A method according to claim 6, wherein a size of the block of signal points is determined based on the size of the block of decisions, and wherein the size of the block of signal points is larger than the block of VD decisions.

9. A method according to claim 8, further comprising storing the block of signal points in a VD input buffer, wherein a size of the VD input buffer corresponds to the size of the block of signal points.

10. A method according to claim 1, further comprising disabling the VD after the block of VD decisions is generated.

11. A method according to claim 1, wherein the VD is one of a plurality of VDs and wherein the one VD is controlled to process a block of signal points when other VDs are busy.

12. An apparatus for detecting symbols in a signal received via a communication channel, wherein the signal includes a plurality of signal points, the apparatus comprising:
   a decision feedback equalizer (DFE) configured to process each signal point in the plurality of signal points to produce a DFE decision;
   a reliability unit configured to assess reliability of the DFE decision to determine whether the DFE decision is one of i) reliable or ii) not reliable; and
   a Viterbi detector (VD) configured to, when it is determined that the DFE decision is not reliable, process a block of signal points of the plurality of signal points to generate a block of VD decisions;
   wherein the apparatus is configured to select the block of VD decisions to be used in place of a block of DFE decisions.

13. An apparatus according to claim 12, wherein:
   the DFE is configured to operate at a clock rate 1/T; and
   the VD is configured to operate at a clock rate 1/NT; wherein
   T is a symbol duration of each symbol in the signal, and N is an integer.

14. An apparatus according to claim 13, wherein N is determined based on a processing time of an Add Compare Select (ACS) loop of the VD.

15. An apparatus according to claim 12, wherein the DFE includes a decision unit configured to generate DFE decisions, and wherein the reliability unit is configured to assess reliability of the DFE decision by comparing an input to the decision unit to a threshold.

16. An apparatus according to claim 15, wherein the threshold is determined based on a signal to noise ratio (SNR) of the received signal.

17. An apparatus according to claim 12, wherein a size of the block of VD decisions is determined based on a burst error length of the DFE.

18. An apparatus according to claim 17, wherein the burst error rate of the DFE is the worst case burst error rate of the DFE.

19. An apparatus according to claim 17, wherein a size of the block of signal points is determined based on the size of the block of decisions, and wherein the size of the block of signal points is larger than the block of VD decisions.

20. An apparatus according to claim 19, further comprising a buffer for storing the block of signal points, wherein a size of the buffer corresponds to the size of the block of signal points.

21. An apparatus according to claim 12, further comprising disabling the VD after the block of VD decisions is generated.

22. An apparatus according to claim 12, wherein the VD is one of a plurality of VDs and wherein the one VD is controlled to process a block of signal points when other VDs are busy.

* * * * *